Oct. 27, 1970   D. B. JACKSON   3,536,806
METHOD FOR MAKING SHAFT SEALS AND THE LIKE
Filed June 19, 1967   2 Sheets-Sheet 1
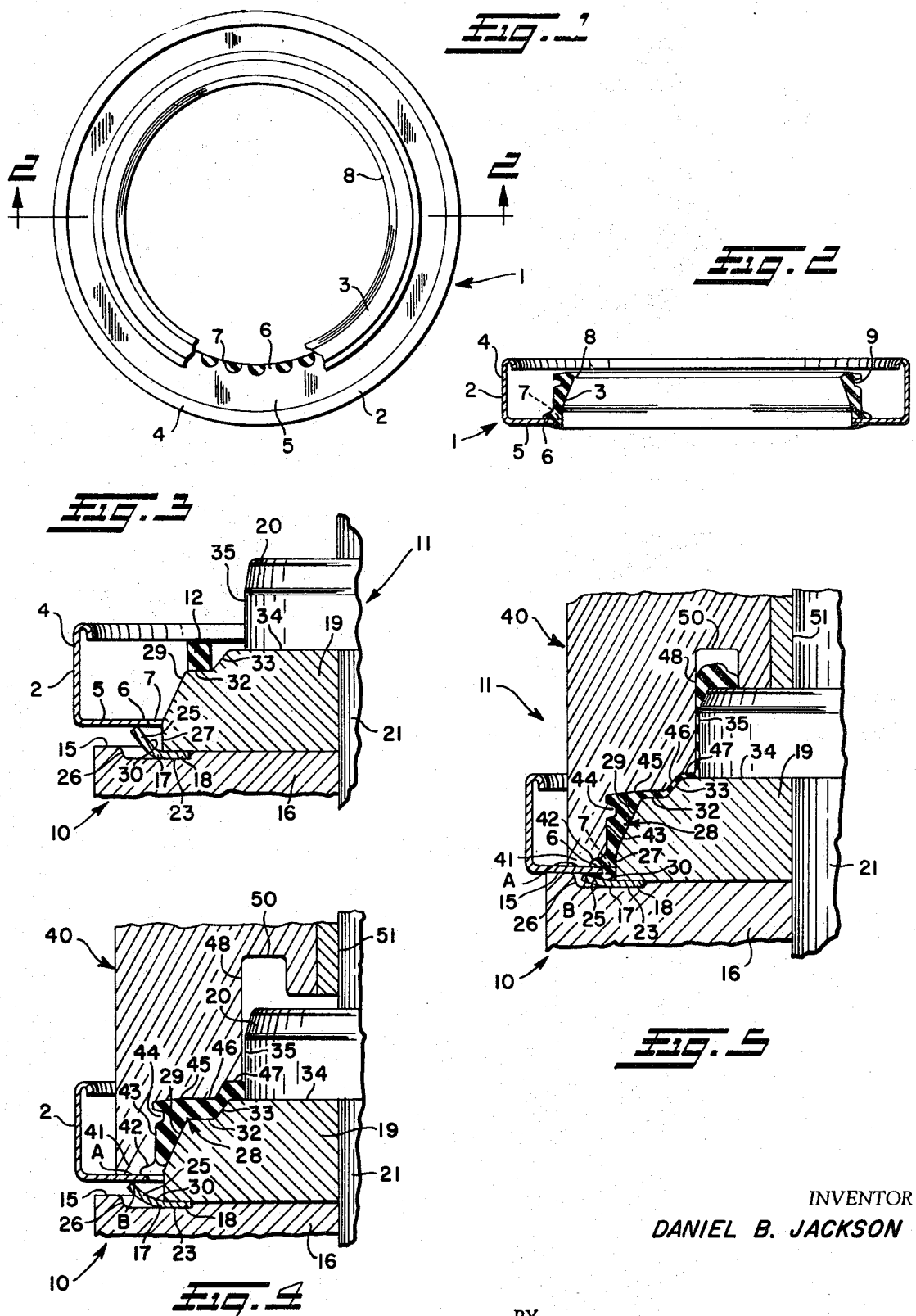
INVENTOR
DANIEL B. JACKSON
BY
Oberlin, Maky, Donnelly & Renner
ATTORNEYS

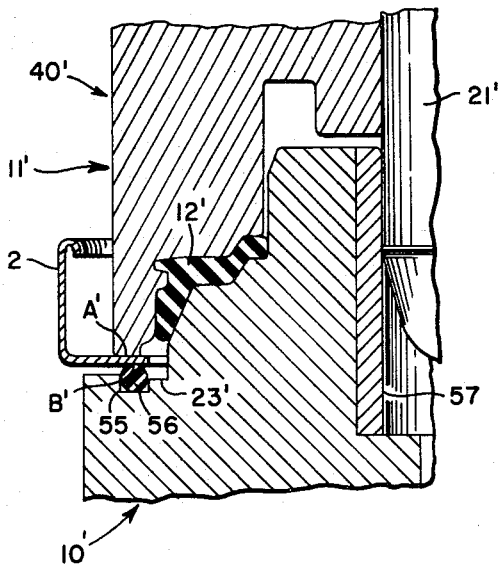
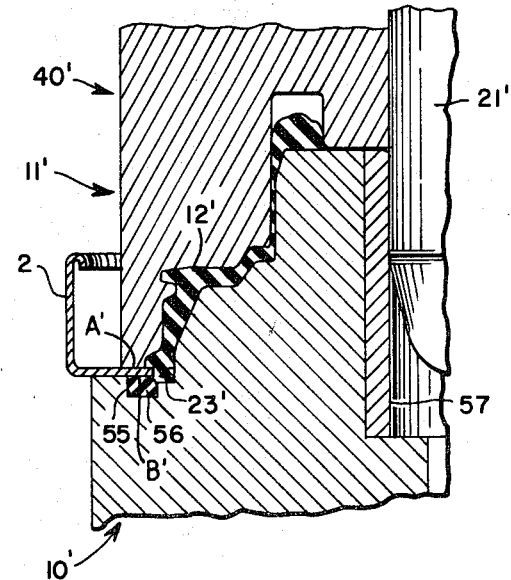

United States Patent Office 3,536,806
Patented Oct. 27, 1970

3,536,806
METHOD FOR MAKING SHAFT SEALS AND THE LIKE
Daniel B. Jackson, Encino, Calif., assignor to Parker-Hannifin Corporation, Cleveland, Ohio, a corporation of Ohio
Filed June 19, 1967, Ser. No. 646,930
Int. Cl. B29d 3/00; B29g 1/00; B29h 9/11
U.S. Cl. 264—268                                   1 Claim

ABSTRACT OF THE DISCLOSURE

A method for making shaft seals by accurately locating the seal casing in the mold by its inner marginal edge and uniformly bonding the sealing member thereto without flash formation or deformation of the casing.

BACKGROUND OF THE INVENTION

The present invention relates to a method and apparatus for making shaft seals by which the resilient sealing member is shaped and cured during bonding of the sealing member to the metal casing of the seal in a new and improved manner.

One of the primary objectives when attaching a sealing member to a metal casing is the prevention of flash formation along the edges of the sealing member where it is bonded to the casing not only to save seal material but to eliminate the necessity of having to remove the flash in a subsequent trimming operation. At the same time, the marginal portion of the casing to which the sealing member is bonded must be accurately centered in the mold cavity and the bonding area between these two parts must be adequate to provide a seal of sufficient strength for long life.

SUMMARY OF THE INVENTION

Although there are various known methods and apparatus for producing seals of this type, they generally contemplate bending or deforming the metal of the casing thereby creating undesirable stresses which weaken the casing, and oftentimes there is insufficient or nonuniform bonding between the casing and sealing member.

These and other attendant problems are eliminated with the method and apparatus of the present invention since the metal casing is very accurately located in the mold cavity prior to bonding the sealing member thereto, and a yieldable support disposed between the metal casing and one of the mold halves provides sufficient pressure contact of the metal casing against the other mold half and yieldable support to preclude flow of the seal material past the area of contact during closing of the mold to avoid flash formation without deforming the casing.

It is accordingly a principal object of this invention to provide a novel method for establishing a flash free bond between the sealing member and casing without deforming or bending the casing metal.

Another object is to provide such a method for establishing a high strength, uniform bond between the sealing member and casing around their entire peripheries.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In such annexed drawings:

FIG. 1 is an end elevation view of a preferred form of shaft seal constructed in accordance with this invention with part of the sealing member broken away to show the inner marginal edge of the casing;

FIG. 2 is a transverse section through the shaft seal of FIG. 1 taken along the plane of the line 2—2 thereof;

FIG. 3 is a fragmentary half-section view of the lower mold half of one type of mold in accordance with this invention which may be used to make the seal of FIGS. 1 and 2, the metal casing being shown centered thereon;

FIG. 4 is a fragmentary half-section view of both the upper and lower mold halves of FIG. 3, shown partially closed causing the rubber stock to flow into the mold cavity;

FIG. 5 is a fragmentary half-section view similar to FIG. 4 but illustrating the mold in its fully closed position;

FIG. 6 is a fragmentary half-section view of another form of mold which may be used to form the seal of FIGS. 1 and 2, such mold being shown partially closed; and FIG. 7 is a fragmentary half-section view of the mold of FIG. 6 shown fully closed.

DESCRIPTION OF THE PREFERRED EMBODIMENTS

Turning now in detail to the drawing and first especially to FIGS. 1 and 2, there is shown by way of example a shaft seal 1 generally comprising an annular metal casing 2 and a sealing member 3 attached thereto. The metal casing 2 may be in the form of a stamping having a cylindrical outer portion 4 with a radially inwardly curled lip at one end and a flat radially inwardly directed annular disc 5 at the other end. The inner marginal portion 6 of the annular disc 5 is peripherally slotted at 7 for a purpose to be explained hereafter, and has attached thereto the flexible sealing member 3 as aforesaid. The sealing member 3 may be of known configuration provided with a sealing lip 8 for engagement with a rotary shaft, not shown, and an outer annular groove 9 in which there may be disposed a garter spring, also not shown, for yieldably maintaining the sealing lip 8 in firm contact with the shaft.

FIG. 3 shows the metal casing 2 in position on the lower mold half 10 of a two-part mold 11 ready for molding of the ring part 12 of rubber or other elastomeric sealing material into the shape of the sealing member 3 and simultaneously bonding the sealing member to the inner marginal portion 6 of the metal casing. As apparent, the casing 2 prior to forming the seal 1 is of the same simple configuration as in the finished product, including the straight cylindrical portion 4 and flat annular disc portion 5. Accordingly, there are no complicated or irregular shapes to be stamped when making the casing which would substantially increase the cost thereof.

The casing 2 is initially supported in spaced relation above a peripheral stop shoulder 15 on the base member 16 of the lower mold half 10 by a dish-shaped spring metal washer 17. The inner periphery 18 of the washer 17 is clamped between the base member 16 and a mold cavity plate 19 releasably held against the base member by the flange 20 of an alignment pin 21 having a nut or the like threadedly engaging its lower end which when tightened draws the flange 20 down against the mold cavity plate 19. The upper surface 23 of the base member 16 which supports the spring washer 17 is flat and extends radially outwardly beyond the outer periphery 25 of the spring washer a distance sufficient to permit substantial flattening of the spring washer during closing of the mold. Outwardly of the flat surface 23 there is an inclined surface 26 which merges with the raised stop shoulder 15.

The mold cavity plate 19 is centrally located on the base member 16 and has a cylindrical surface 27 projecting upwardly from the inner periphery 18 of the spring washer 17 for accurately locating the inner marginal portion 6 of the casing 2 in the mold cavity 28 due to the close sliding fit of the casing 2 over the cylindrical surface. A frusto-conical surface 29 joins the cylindrical surface 27 and aids in guiding the casing 2 onto the cylindrical surface. Such accurate centering of the casing 2 is helpful in achieving the desired concentric bonding between the sealing member 3 and casing 2 in a manner to be subsequently described. In addition to their respective guiding and centering functions, the frusto-conical surface 29 and cylindrical surface 27 define in conjunction with the upper surface 30 of the spring washer 17 the lower wall of the mold cavity 28 which shapes the inner wall of the sealing member 3.

Above the frusto-conical surface 29 there is a generally radial platform 32 on which the ring 12 of molding material is placed. The radial platform 32 is intersected by a second frusto-conical surface 33 which leads to the flat upper end face 34 of the mold cavity plate 19 engaged by the alignment pin flange 20. The flange 20 in turn has a substantially cylindrical outer surface 35 projecting upwardly from the end face 34.

The upper mold half 40 has a downwardly depending rim portion 41 which terminates in a radially inwardly directed flat annular surface 42 intersecting a vertically extending cylindrical surface 43. Adjacent the upper extremity of the cylindrical surface 43 is an inwardly projecting annular rib 44 which forms the spring groove 9 in the sealing member 7 during the molding operation. The cylindrical surface 43 leads to a flat end surface 45 which partly overlies the radial platform 32 on the mold cavity plate 19 for providing initial contact with the ring 12 material during closing of the mold 11. The rim portion 41, radial surface 42, cylindrical surface 43, rib 44, and end surface 45 define the upper wall of the mold cavity 28 which shapes the outer wall of the sealing member.

Intersecting the inner edge of the flat end surface 45 is a frusto-conical surface 46 having a taper which matches the second frusto-conical surface 33 on the mold cavity plate 19. The frusto-conical surface 46 terminates in a radially inwardly extending shoulder 47 which overlies the outer periphery of the flat end face 34, and is followed by an upwardly extending cylindrical surface 48 generally concentric with respect to the cylindrical outer surface 35 of the flange 20. An extension of the cylindrical surface 48 forms one wall of an annular groove 50 in the upper mold half 40 in which any excess ring 12 material will be finally trapped. A central aperture 51 in the upper mold half 40 is adapted to receive the alignment pin 21 for accurately aligning the upper mold half with respect to the lower mold half 10.

With the casing 2 and ring 12 in position on the lower mold half 10 as shown in FIG. 3, the upper mold half 40 is inserted over the alignment pin 21 and lowered into engagement with the ring 12 causing the ring to be compressed. Continued movement of the upper mold half 40 toward the lower mold half 10 causes the ring material to flow downwardly into the mold cavity 28 due to the larger flow path between the surfaces which define the mold cavity than between the cylindrical surfaces 35, 48. Before the ring material reaches the casing 2, however, the rim portion 41 of the upper mold half 40 engages the casing causing it to move downwardly against the bias of the spring washer 17 in the manner shown in FIG. 4.

The force exerted by the spring washer 17 resisting such downward movement of the casing 2 provides sufficient pressure at the areas of contact A and B of the rim 41 and spring washer 17 with the casing to preclude flow of ring material therepast despite the high squeezing force applied thereto by the upper mold half, thereby preventing the formation of flash. As the upper mold half 40 approaches the fully closed position, the spring washer 17 is progressively flattened thereby providing a progressively increasing pressure which is always sufficient to preclude mold material to be squeezed beyond the contact points A, B. No deformation of the casing 2 is required to prevent flash, and the outer rim portion 41 of the upper mold half 40 may radially overlap the inner and outer edges of the stop shoulder 15 and spring washer 17, respectively, to assure against deformation of the casing during closing of the mold. Any excess ring material will be forced upwardly between the cylindrical surfaces 35, 48 of the lower and upper mold halves 10 and 40 where it will be trapped in the annular groove 50.

The peripheral slots 7 in the inner marginal edge 6 of the casing 2 permit the ring 12 molding material to flow through the casing and establish contact with both sides thereof, and because the inner marginal edge 6 extends the full width of the mold cavity 28 by reasons of the close sliding fit over the cylindrical surface 27, the contact area between the ring molding material and casing is substantial. FIG. 5 shows the mold 11 fully closed with the mold cavity 28 completely filled by the ring 12 material, contacting both sides of the inner marginal edge 6 of the casing 2 over a substantial and uniform area and filling all of the peripheral slots 7. Accordingly, when the ring material is completely cured, it will form a tight bond with the casing 2 over a substantial area uniformly around the inner marginal edge 6, thereby assuring long seal life.

When the mold material is fully cured, the mold 11 is opened and the seal 1 is removed, after which the only operation remaining to complete the seal 1 is the final shaping of the sealing lip 8 by lathe trimming or the like.

Instead of using a metal spring washer for establishing the desired pressure contact with the casing 2 during closing of the mold to prevent flash formation without deforming the casing, other types of yieldable elements may be used as well. As an example, there is shown in FIGS. 6 and 7 a mold 11' provided with an annular recess 55 in the flat surface 23' provided with an annular 10' for receipt of an O-ring 56 of resilient material which like the spring washer 17 of the FIGS. 1–5 embodiment will resist downward movement of the casing 2 and establish areas A', B' of high pressure contact with opposite sides of the casing 2 to prevent material leakage. The O-ring 56 is desirably compressed during the last .020 inch to .040 inch movement of the upper mold half 40' for proper mold closure with controlled mold material loads.

Because the O-ring 56 need not be clamped in the lower mold half 10' like the spring washer 17, the lower mold half 10' may be of a one-piece construction rather than the two-piece construction of FIGS. 3–5, and the alignment pin 21' may be carried by the upper mold half 40' for receipt in a central aperture 57 in the lower mold half if desired. Otherwise, the construction of the mold 11' of FIGS. 6 and 7 is substantially identical to the mold 11 and accordingly the same reference numbers followed by a prime symbol are used to designate like parts. Moreover, since the operation of the mold 11' is likewise substantially the same as the operation of the mold 11, no further discussion is thought to be necessary.

It will now be appreciated that the various methods and apparatus disclosed herein permit the inexpensive manufacture of high strength, long lived shaft seals and the like. Relatively inexpensive metal stampings may be used for the casings since they are not deformed during manufacture of the seals and thus there is no chance of unduly stressing or weakening the casings, and the bond between the sealing members and casings cannot be damaged by any such deformation or spring-back of the metal casings.

Other modes of applying the principles of the invention may be employed, change being made as regards the details described provided the features stated in any of the following claim or the equivalent of such be employed.

I, therefore, particularly point out and distinctly claim as my invention:

1. A method of molding and bonding an elastomeric sealing member to a metal casing to form a seal, such casing including a radially inwardly directed annular disc having an inner marginal portion to both sides of which the sealing member is to be bonded, comprising the steps of positioning the inner marginal portion of the radially inwardly directed disc in a mold and accurately concentrically locating such annular disc in the mold by providing a close sliding fit between the inner edge of such inner marginal portion and a cylindrical surface on the mold, closing the mold to apply axial pressure to an annular area on one side of such annular disc radially outwardly of such inner marginal portion and deform a yieldable element in such mold by engagement by an annular area on the other side of such annular disc radially outwardly of such inner marginal portion to an extent sufficient to prevent flow of sealing member material outwardly beyond the annular areas without deforming such annular disc, and forcing such sealing member material through peripheral slots in such inner marginal portion during closing of the mold for engagement with both sides of such inner marginal portion to bond such sealing member material thereto without the formation of flash.

References Cited

UNITED STATES PATENTS

| 3,398,222 | 8/1968 | Kaufman | 264—273 X |
| 2,541,297 | 2/1951 | Sampson | 264—266 X |
| 3,241,845 | 3/1966 | Smith. | |
| 3,276,114 | 10/1966 | Blaurock | 264—268 X |

FOREIGN PATENTS

| 984,032 | 2/1965 | Great Britain. |

ROBERT F. WHITE, Primary Examiner

A. M. SOKAL, Assistant Examiner

U.S. Cl. X.R.

264—273, 276, 313; 18—36